(12) United States Patent
Kim

(10) Patent No.: US 11,522,211 B2
(45) Date of Patent: Dec. 6, 2022

(54) APPARATUS FOR MANUFACTURING CELL STACK FOR SECONDARY BATTERY

(71) Applicant: Woowon Technology Co., Ltd, Gyeonggi-do (KR)

(72) Inventor: Tae Wan Kim, Gyeonggi-do (KR)

(73) Assignee: Woowon Technology Co., Ltd, Gyeonggi-do (KR)

(*) Notice: Subject to any disclaimer, the term of this patent is extended or adjusted under 35 U.S.C. 154(b) by 255 days.

(21) Appl. No.: 16/928,536

(22) Filed: Jul. 14, 2020

(65) Prior Publication Data
US 2021/0265650 A1 Aug. 26, 2021

(30) Foreign Application Priority Data
Feb. 21, 2020 (KR) .................. 10-2020-0021754

(51) Int. Cl.
*H01M 10/04* (2006.01)
(52) U.S. Cl.
CPC ... *H01M 10/0404* (2013.01); *H01M 10/0459* (2013.01); *H01M 10/0468* (2013.01)
(58) Field of Classification Search
CPC ..... H01M 10/02–0404; H01M 10/0459–0472; H01M 10/0481–0486; H01M 10/058–0583
See application file for complete search history.

(56) References Cited

U.S. PATENT DOCUMENTS

| 2010/0306995 A1* | 12/2010 | Scheuerman | ........ H01M 50/211 29/730 |
| 2021/0057775 A1* | 2/2021 | Abe | ................. H01M 10/0404 |

FOREIGN PATENT DOCUMENTS

| JP | 2004022449 A | * | 1/2004 | ........... H01M 10/04 |
| KR | 10-0313119 B1 | | 11/2001 | |
| KR | 10-1140447 B1 | | 4/2012 | |
| KR | 10-1730469 B1 | | 4/2017 | |

(Continued)

OTHER PUBLICATIONS

Machine Translation of Kim, KR 101730469. Originally published Apr. 27, 2017 (Year: 2017).*

(Continued)

*Primary Examiner* — Jonathan Crepeau
*Assistant Examiner* — Jacob Buchanan
(74) *Attorney, Agent, or Firm* — Harness, Dickey & Pierce, P.L.C.

(57) ABSTRACT

There is provided an apparatus for manufacturing a cell stack for a secondary battery, the apparatus including: a stack table on which a negative electrode plate and a positive electrode plate are sequentially stacked with a separator interposed therebetween; an electrode-plate-stacking-position adjusting means; a clamping means; a drive means configured to reciprocally turn the stack table, the electrode-plate-stacking-position adjusting means, and the clamping means to both sides so that the separator supplied to the stack table is folded in a zigzag shape and the negative electrode plate and the positive electrode plate are alternately stacked between folded portions of the separator; and a support means configured to support the stack table, the electrode-plate-stacking-position adjusting means, the clamping means, and the drive means.

14 Claims, 12 Drawing Sheets

(56) References Cited

FOREIGN PATENT DOCUMENTS

KR 10-1933550 B1 12/2018

OTHER PUBLICATIONS

Machine Translation of Kim, KR 101933550. Originally published Dec. 31, 2018 (Year: 2018).*
Machine Translation of Fukunaga, JP 2004-022449. Originally published Jan. 22, 2004 (Year: 2004).*

* cited by examiner

APPARATUS FOR MANUFACTURING CELL STACK FOR SECONDARY BATTERY

CROSS-REFERENCE TO RELATED APPLICATIONS

This application claims the priority of Korean Patent Application No. 10-2020-0021754 filed on Feb. 21, 2020, in the Korean Intellectual Property Office, the disclosure of which is incorporated herein by reference.

FIELD

The present disclosure relates to an apparatus for manufacturing a cell stack for a secondary battery, and more particularly, to an apparatus for manufacturing a cell stack for a secondary battery, the apparatus being capable of manufacturing a cell stack by a Z-stacking method.

BACKGROUND

This section provides background information related to the present disclosure which is not necessarily prior art.

In general, a chemical battery refers to a battery including an electrolyte and a pair of electrodes including a positive electrode plate and a negative electrode plate, and the amount of energy, which may be stored, varies depending on substances that constitute the electrodes and the electrolyte. Such chemical batteries are classified into primary batteries used only once by being discharged, and secondary batteries that may be reused by being repeatedly charged and discharged.

Since the secondary batteries may be repeatedly charged and discharged, the secondary batteries are applied to various technical fields throughout the industry. For example, the secondary batteries are widely used as energy sources for cutting-edge electronic devices such as wireless mobile devices, and the secondary batteries also attract attention as energy sources for hybrid electric vehicles that have been proposed to solve the problem of air pollution caused by gasoline and diesel internal combustion engines in the related art that use fossil fuel.

As can be seen by anyone, the secondary battery is configured such that a positive electrode plate, a separator, and a negative electrode plate are sequentially stacked and immersed in an electrolyte solution. There are broadly two types of methods that manufacture inner cell stacks for secondary batteries.

That is, in order to manufacture small secondary batteries, a method is widely used, which arranges the negative electrode plate and the positive electrode plate on the separator and rolls (winds) the negative electrode plate, the positive electrode plate, and the separator in the form of a jelly roll. Further, in order to manufacture medium and large secondary batteries having a larger electric capacity, a method is widely used, which stacks, in an appropriate order, the negative electrode plate, the positive electrode plate, and the separator.

In addition, there are various methods of manufacturing the inner cell stacks for secondary batteries by stacking the negative electrode plates, the positive electrode plates, and the separators. A Z-stacking method, among the various methods, folds the separators in a zigzag pattern and stacks the negative electrode plates, the positive electrode plates, and the separators in a state in which the negative electrode plates and the positive electrode plates are alternately inserted between the separators.

The inner cell stack for a secondary battery manufactured by the Z-stacking method is disclosed in Korean Patent No. 10-0313119, and the like.

Further, examples of an apparatus capable of manufacturing a cell stack by the Z-stacking method are disclosed in Korean Patent No. 10-1140447, Korean Patent No. 10-1730469, Korean Patent No. 10-1933550, and the like.

However, in the case of the cell stack manufacturing apparatus disclosed in Korean Patent No. 10-1730469 and the electrode stack disclosed in Korean Patent No. 10-1933550, there is a problem in that positions at which the negative and positive electrode plates are stacked are raised as the number of times of stacking the negative and positive electrode plates increases, which causes a problem that the separator is torn or broken when supplying the separator to the positions at which the negative and positive electrode plates are stacked.

That is, the separator needs to be supplied to be approximately horizontal with respect to the positions at which the negative and positive electrode plates are stacked. However, in the case in which the positions at which the negative and positive electrode plates are stacked are raised as the number of times of stacking the negative and positive electrode plates increases, the separator cannot be horizontal with respect to the positions at which the negative and positive electrode plates are stacked, which causes a problem that the separator is torn or damaged.

Accordingly, the inventors of the present application have tried to solve the problems caused by the cell stack manufacturing apparatus disclosed Korean Patent No. 10-1730469 and the electrode stack disclosed in Korean Patent No. 10-1933550, and as a result, the present disclosure is filed for a patent application.

DOCUMENTS OF RELATED ART

Patent Documents

Korean Patent No. 10-0313119
Korean Patent No. 10-1140447
Korean Patent No. 10-1730469
Korean Patent No. 10-1933550

SUMMARY

An object of the present disclosure is to provide an apparatus for manufacturing a cell stack for a secondary battery, the apparatus being capable of always maintaining a constant position (height) at which negative and positive electrode plates are stacked regardless of the number of times of stacking the negative and positive electrode plates during a process of manufacturing a cell stack.

This section provides a general summary of the disclosure and is not a comprehensive disclosure of its full scope or all of its features.

An aspect of the present disclosure provides an apparatus for manufacturing a cell stack for a secondary battery, the apparatus including: a stack table on which a negative electrode plate and a positive electrode plate are sequentially stacked with a separator interposed therebetween; an electrode-plate-stacking-position adjusting means configured to adjust a position of the stack table so that the negative electrode plate and the positive electrode plate are stacked at a constant position regardless of the number of times of stacking the negative electrode plate and the positive electrode plate; a clamping means configured to press, toward the stack table, edge portions at one side and the other side of each of the negative electrode plate, the positive electrode plate, and the separator, which are stacked on the stack table, and to clamp the edge portions of the negative electrode plate, the positive electrode plate, and the separator; a drive means configured to reciprocally turn the stack table, the electrode-plate-stacking-position adjusting means, and the clamping means to both sides so that the separator supplied to the stack table is folded in a zigzag shape and the negative electrode plate and the positive electrode plate are alternately stacked between folded portions of the separator; and a support means configured to support the stack table, the electrode-plate-stacking-position adjusting means, the clamping means, and the drive means.

In the apparatus for manufacturing a cell stack for a secondary battery according to one aspect of the present disclosure, the support means may include: a base; first and second support frames extending in a longitudinal direction of the base, extending vertically outward from an upper surface of the base, and disposed to be spaced apart from each other; a mounting frame disposed between the first and second support frames so as to be movable upward and downward; and a mounting frame lifting servo motor configured to raise or lower the mounting frame.

In the apparatus for manufacturing a cell stack for a secondary battery according to one aspect of the present disclosure, the mounting frame lifting servo motor may be installed on a lower surface of the base, a rotating shaft of the mounting frame lifting servo motor may penetrate the base and vertically extend, a mounting frame lifting ball screw may be vertically connected to the rotating shaft of the mounting frame lifting servo motor, and a mounting frame lifting ball screw nut, which is engaged with and penetrated by the mounting frame lifting ball screw, may be installed on a lower portion of the mounting frame.

In the apparatus for manufacturing a cell stack for a secondary battery according to one aspect of the present disclosure, the drive means may include: a tilting frame on which the stack table, the electrode-plate-stacking-position adjusting means, and the clamping means are mounted; and a tilting servo motor configured to reciprocally turn the tilting frame to both sides of the mounting frame of the support means, and the tilting servo motor may be installed on an upper portion at one end or the other end of the mounting frame and connected to the tilting frame.

In the apparatus for manufacturing a cell stack for a secondary battery according to one aspect of the present disclosure, the tilting frame may include: a head part disposed at a recessed central portion of the mounting frame and horizontally extending in a longitudinal direction of the mounting frame; and a skirt part formed integrally on a lower surface of the head part, in which both ends of the head part may horizontally extend outward from both ends of the skirt part, and tilting shafts may be mounted at both ends of the head part and may horizontally extend to an upper portion at one end and an upper portion at the other end of the mounting frame which are adjacent to each other, and in which extension ends of the tilting shafts, which extend to the upper portion at one end and the upper portion at the other end of the mounting frame, may be rotatably supported on the upper portion at one end and the upper portion at the other end of the mounting frame, and any one of the tilting shafts may be connected to the tilting servo motor.

In the apparatus for manufacturing a cell stack for a secondary battery according to one aspect of the present disclosure, the electrode-plate-stacking-position adjusting means may include: a stacking position adjusting servo motor installed on a bottom of a hollow portion formed in a skirt part of a tilting frame of the drive means; a stacking position adjusting ball screw connected to a rotating shaft of the stacking position adjusting servo motor, penetrating the skirt part, and penetrating a second lift plate disposed at a lower side of the skirt part, and the stacking position adjusting ball screw being configured to be engage with and penetrate a stacking position adjusting ball screw nut installed on the second lift plate; and a third lift plate disposed between a head part of the tilting frame and the stack table to support the stack table and connected to the second lift plate by means of second connecting rods, and the stacking position adjusting servo motor lowers the second lift plate, the third lift plate, and the stack plate by rotating the stacking position adjusting ball screw by a length corresponding to a thickness of the stacked negative electrode plate or the stacked positive electrode plate during a process of manufacturing a cell stack.

In the apparatus for manufacturing a cell stack for a secondary battery according to one aspect of the present disclosure, the third lift plate and the stack table may be connected by means of leg members, and the leg members may connect a suction table of the stack table that faces an upper surface of the third lift plate adjacent to both ends the third lift plate.

In the apparatus for manufacturing a cell stack for a secondary battery according to one aspect of the present disclosure, extension brackets, which vertically and slidably penetrate the head part and face both ends of the skirt part, may vertically extend from a lower surface of the third lift plate which is connected to both ends of the third lift plate, stacking position adjusting LM guides may be installed at both ends of the skirt part which face the extension brackets, the stacking position adjusting LM guides may be installed vertically in a longitudinal direction of the skirt part, and stacking position adjusting LM guide blocks, which are slidably fitted with the stacking position adjusting LM guides, may be installed on the extension brackets.

In the apparatus for manufacturing a cell stack for a secondary battery according to one aspect of the present disclosure, the stack table may include: a suction table disposed to be spaced apart from an upper side of the head part and having a "]" shape when viewed in a plan view; a lift table provided to occupy the inside of the suction table; and lift table lifting cylinders configured to raise or lower the lift table, the lift table lifting cylinders may be installed at lower sides at both ends of the second lift plate so that cylinder rods are extended outward from a lower portion of the second lift plate, the cylinder rods of the lift table lifting cylinders may be connected to each other by a first lift plate horizontally disposed outside a lower portion of the second lift plate, and the first lift plate and the lift table may be connected by means of first connecting rods that penetrate the second lift plate, the skirt part, the head part, and the third lift plate.

In the apparatus for manufacturing a cell stack for a secondary battery according to one aspect of the present disclosure, the clamping means may include: four gripper assemblies disposed at both ends at one side and both ends at the other side of the stack table; first and second gripper moving units configured to allow the two gripper assemblies, which face each other in a longitudinal direction of the stack table, to cooperate with each other, and to move the two gripper assemblies so that the two gripper assemblies, which cooperate with each other, alternately press edges at one side and the other side of each of the separator, the negative electrode plate, and the positive electrode plate which are stacked on the stack table; first and second clamping frames configured to support the first and second gripper moving units, respectively; and first and second gripper lifting units configured to raise or lower the first and second clamping frames to allow the gripper assemblies to alternately press the edges at one side and the other side of each of the separator, the negative electrode plate, and the positive electrode plate which are stacked on the stack table.

In the apparatus for manufacturing a cell stack for a secondary battery according to one aspect of the present disclosure, the first and second clamping frames may horizontally extend in a longitudinal direction of the mounting frame at one side and the other side of the mounting frame of the support means, the first and second clamping frames may be mounted to be movable upward and downward at one side and the other side of a skirt part of a tilting frame of the drive means, first and second gripper assembly lifting LM guides may be installed vertically in a longitudinal direction of the skirt part at one side and the other side of the skirt part, and first and second gripper assembly lifting LM guide blocks, which are slidably fitted with the first and second gripper assembly lifting LM guides, may be installed on inner surfaces of the first and second clamping frames which face the first and second gripper assembly lifting LM guides, in which the first and second gripper lifting units may include: first and second gripper assembly lifting servo motors disposed at lower sides of outer surfaces of the first and second clamping frames; and first and second gripper assembly lifting ball screws configured to rotate by being connected, by power transmission means, to rotating shafts of the first and second gripper assembly lifting servo motors, and in which each of the first and second gripper assembly lifting ball screws may be disposed vertically between the skirt part and each of the first and second clamping frames, and first and second gripper assembly lifting ball screw nuts, which are engaged with and penetrated by the first and second gripper assembly lifting ball screws, may be installed on inner surfaces of the first and second clamping frames.

In the apparatus for manufacturing a cell stack for a secondary battery according to one aspect of the present disclosure, the first gripper moving unit may include: a pair of gripper assembly moving servo motors installed at both ends of a lower portion of the first clamping frame; and a pair of gripper assembly moving ball screws rotatably supported on an upper portion of the first clamping frame and extending horizontally in a longitudinal direction of the first clamping frame so as not to interfere with each other at the upper portion of the first clamping frame, the pair of gripper assembly moving ball screws having screw threads extending in opposite directions, in which the gripper assembly moving ball screws of the first gripper moving unit may be connected, by power transmission means, to the gripper assembly moving servo motors disposed adjacent to the gripper assembly moving ball screws, in which the second gripper moving unit may include: a pair of gripper assembly moving servo motors installed at both ends of a lower portion of the second clamping frame; and a pair of gripper assembly moving ball screws rotatably supported on an upper portion of the second clamping frame and extending horizontally in a longitudinal direction of the second clamping frame so as not to interfere with each other at the upper portion of the second clamping frame, the pair of gripper assembly moving ball screws having screw threads extending in opposite directions, in which the gripper assembly moving ball screws of the second gripper moving unit may be connected, by power transmission means, to the gripper assembly moving servo motors disposed adjacent to the gripper assembly moving ball screws.

In the apparatus for manufacturing a cell stack for a secondary battery according to one aspect of the present disclosure, each of the gripper assemblies may include: a slider; and a gripper mounted on the slider and having a bar shape extending horizontally, and in which the two gripper assemblies may be connected to and may face the pair of gripper assembly moving ball screws of the first gripper moving unit, the two gripper assemblies may be connected to and may face the pair of gripper assembly moving ball screws of the second gripper moving unit, gripper assembly moving ball screw nuts, which are engaged with the corresponding gripper assembly moving ball screws, may be installed on the sliders of the gripper assemblies, and gripper assembly moving LM guide blocks, which are slidably fitted with first and second gripper assembly moving LM guides formed outer surfaces of the first and second clamping frames, may be installed on the sliders of the gripper assemblies.

In the apparatus for manufacturing a cell stack for a secondary battery according to one aspect of the present disclosure, the gripper may be mounted on an actuator so as to be movable upward and downward, the actuator may be fixedly mounted on a variable block having a vertical plate shape, and the variable block may be coupled and supported, by means of screws, onto a rear surface of a fixed block fixedly mounted on the slider.

In the apparatus for manufacturing a cell stack for a secondary battery according to one aspect of the present disclosure, a first fixing piece may be protrudingly mounted at one side of the fixed block, a first variable piece, which vertically faces the first fixing piece, may be protrudingly mounted on the variable block which faces the first fixing piece, a first fine adjustment bolt having a threaded portion having an end fastened to the first variable piece may be fitted with the first fixing piece, a second fixing piece, which extends horizontally while penetrating the variable block, may be mounted at the other side of the fixed block, a second variable piece, which faces the second fixing piece in a left-right direction, may be protrudingly mounted on a rear surface of the variable block, and a second fine adjustment bolt having a threaded portion having an end fastened to the second fixing piece may be fitted with the second variable piece.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
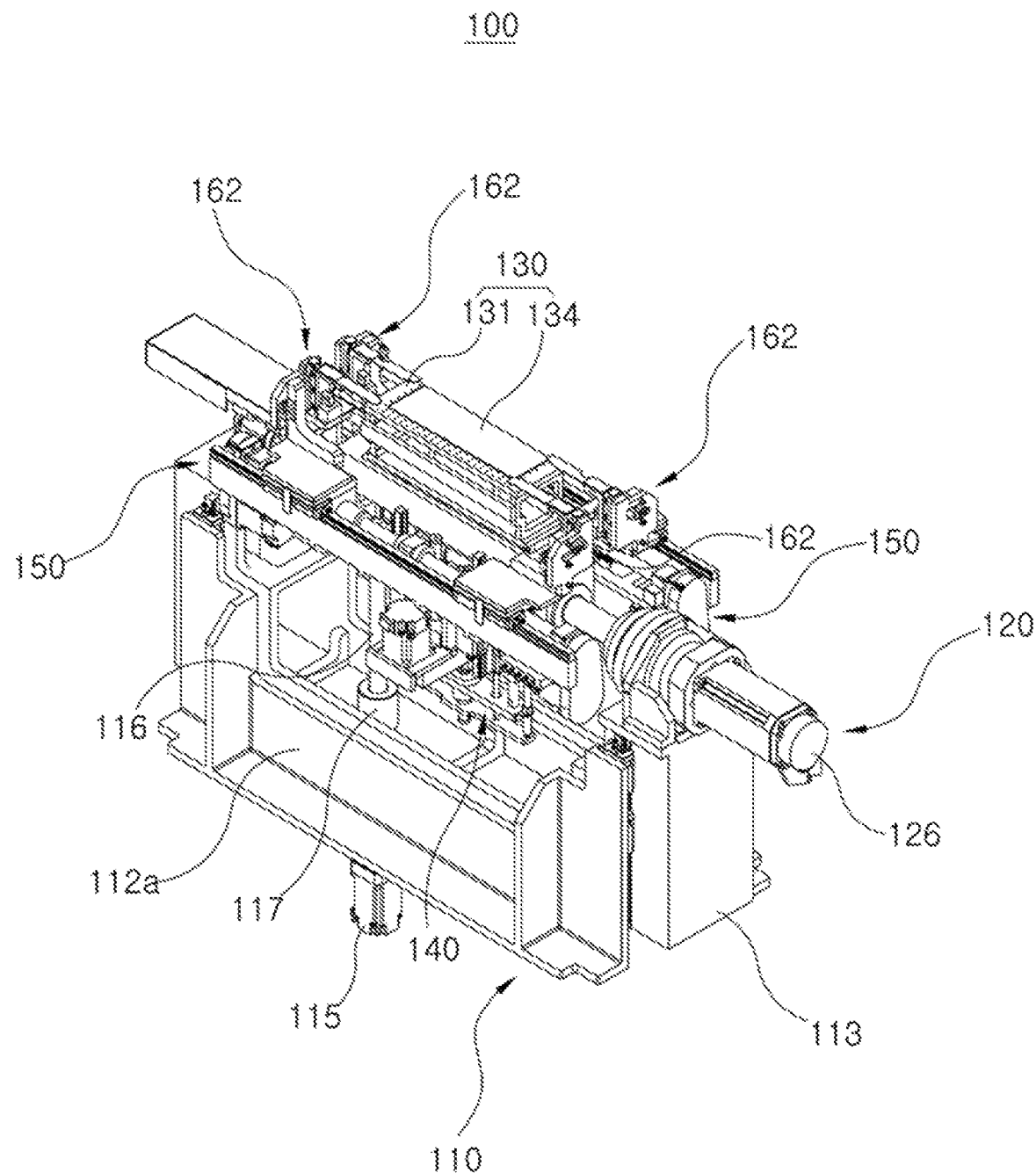
FIG. 1 is a perspective view illustrating an apparatus for manufacturing a cell stack for a secondary battery according to the present disclosure.
Figure 2:
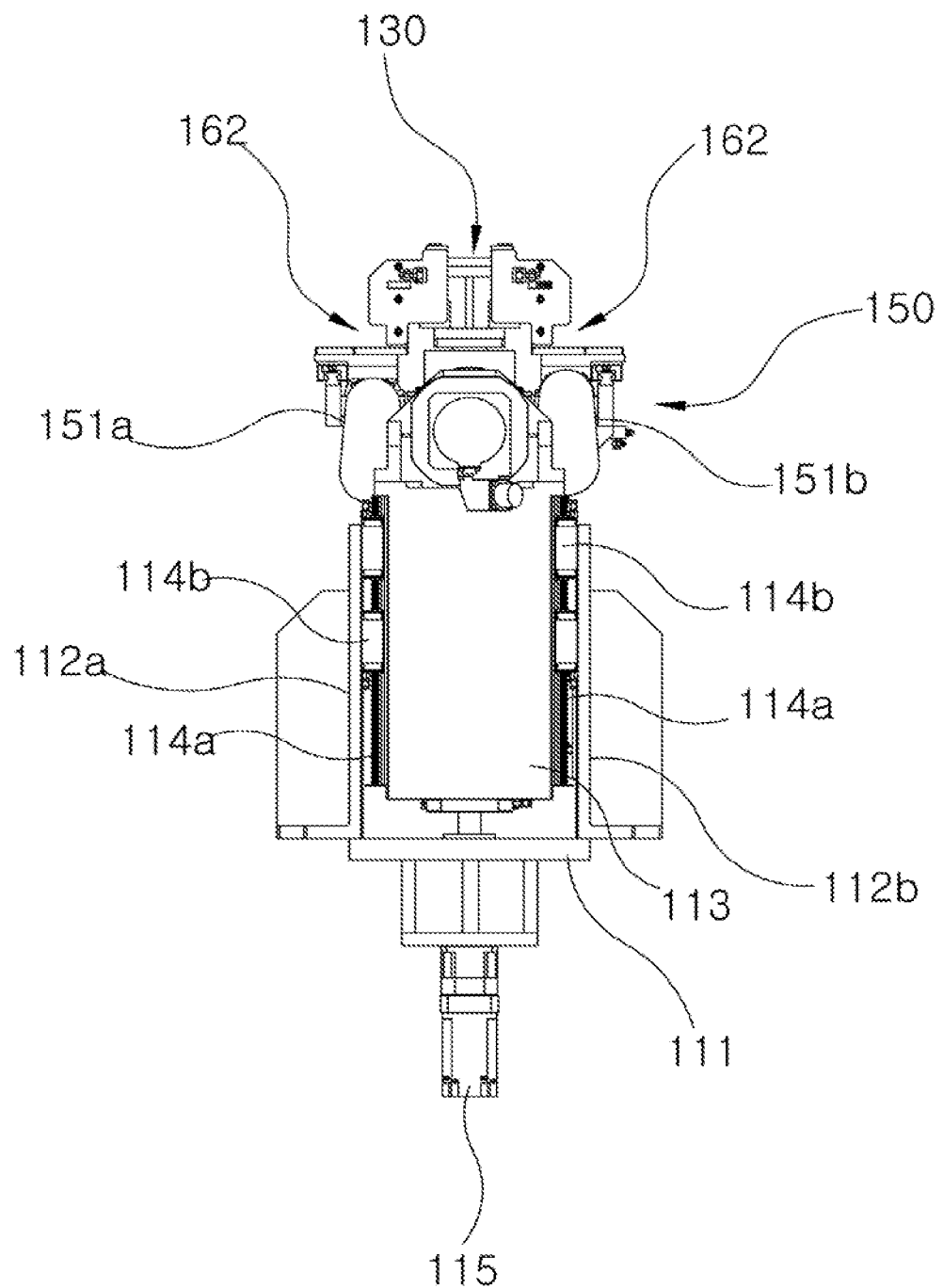
FIG. 2 is a side view of the apparatus for manufacturing a cell stack for a secondary battery illustrated in FIG. 1.
Figure 3:
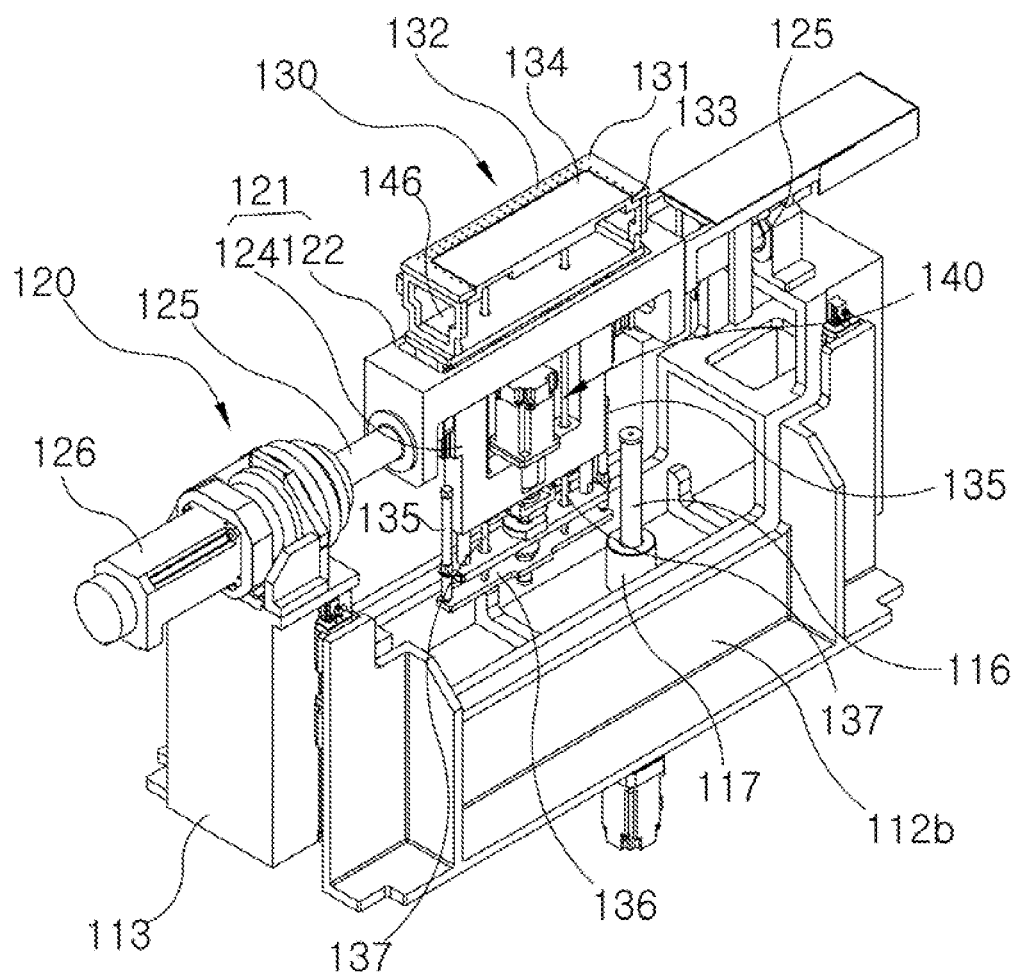
FIG. 3 is a perspective view illustrating a drive means and an electrode-plate-stacking-position adjusting means illustrated in FIG. 1.
Figure 4:
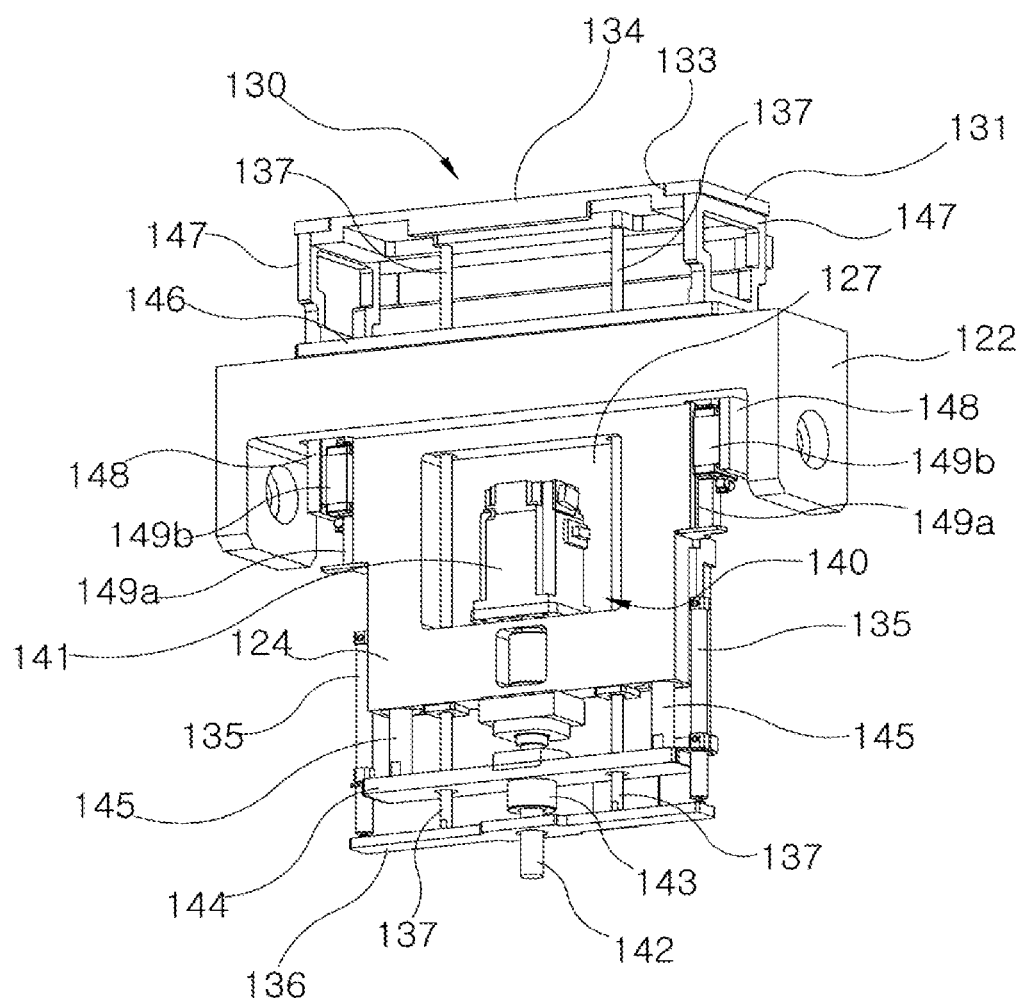
FIG. 4 is an enlarged perspective view of the electrode-plate-stacking-position adjusting means illustrated in FIG. 3.
Figure 5A:
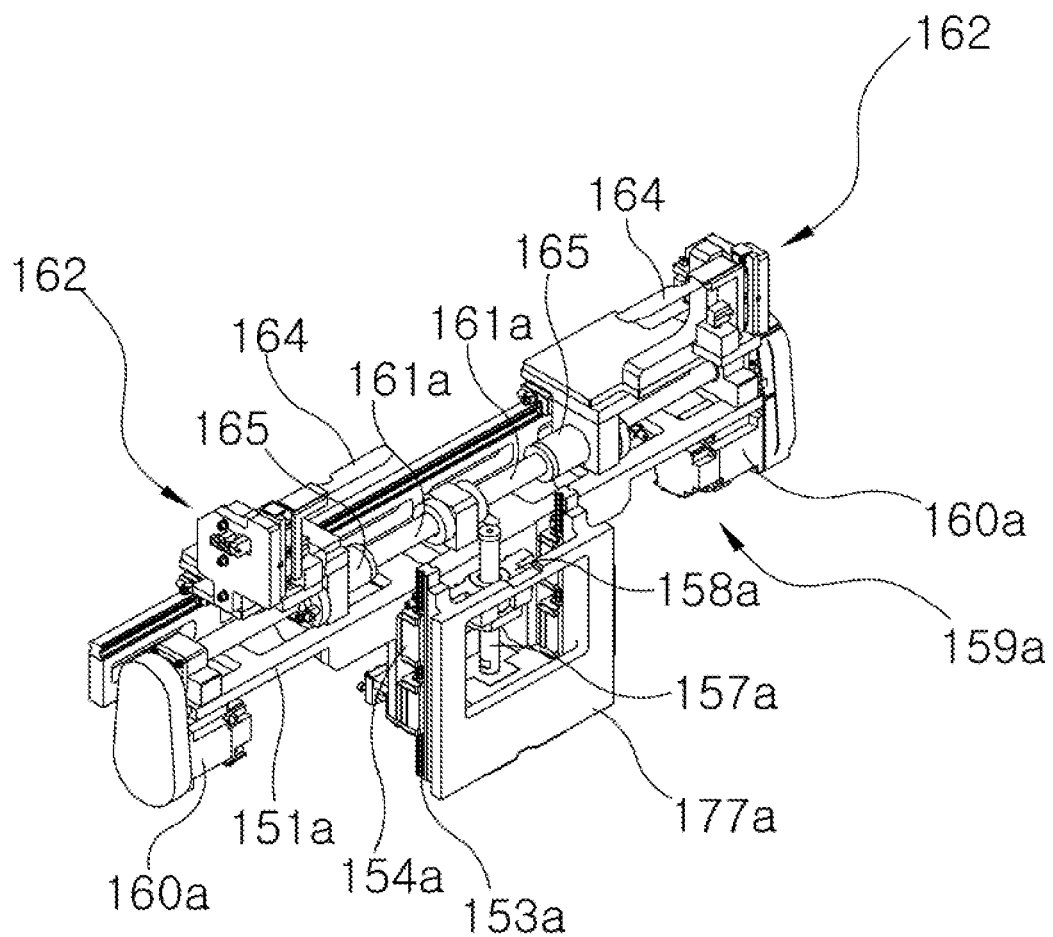
FIGS. 5A and 5B are views illustrating a clamping means illustrated in FIG. 1, that is, perspective views illustrating connection relationships between a first gripper lifting unit, a first gripper moving unit, and two gripper assemblies disposed on a first clamping frame.
Figure 5B:
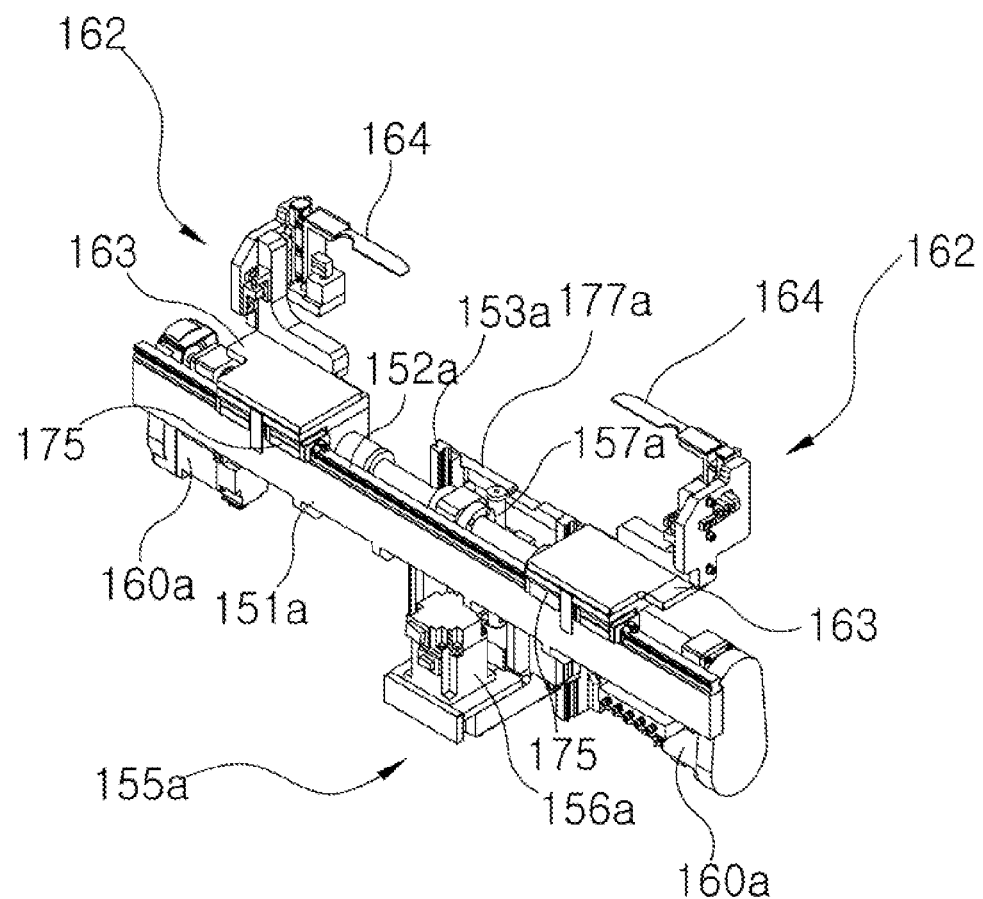
Figure 6A:
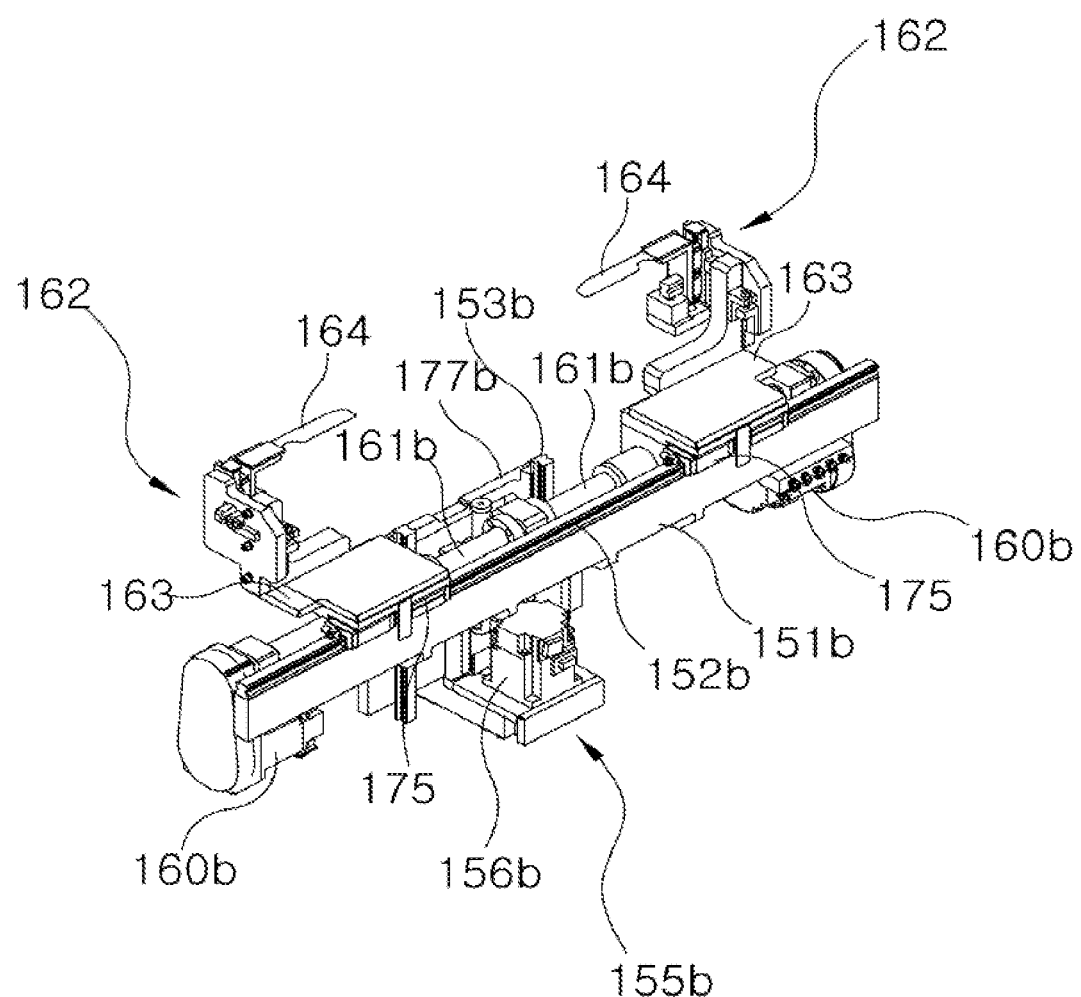
FIGS. 6A and 6B are views illustrating the clamping means illustrated in FIG. 1, that is, perspective views illustrating connection relationships between a second gripper lifting unit, a second gripper moving unit, and two gripper assemblies disposed on a second clamping frame.
Figure 6B:
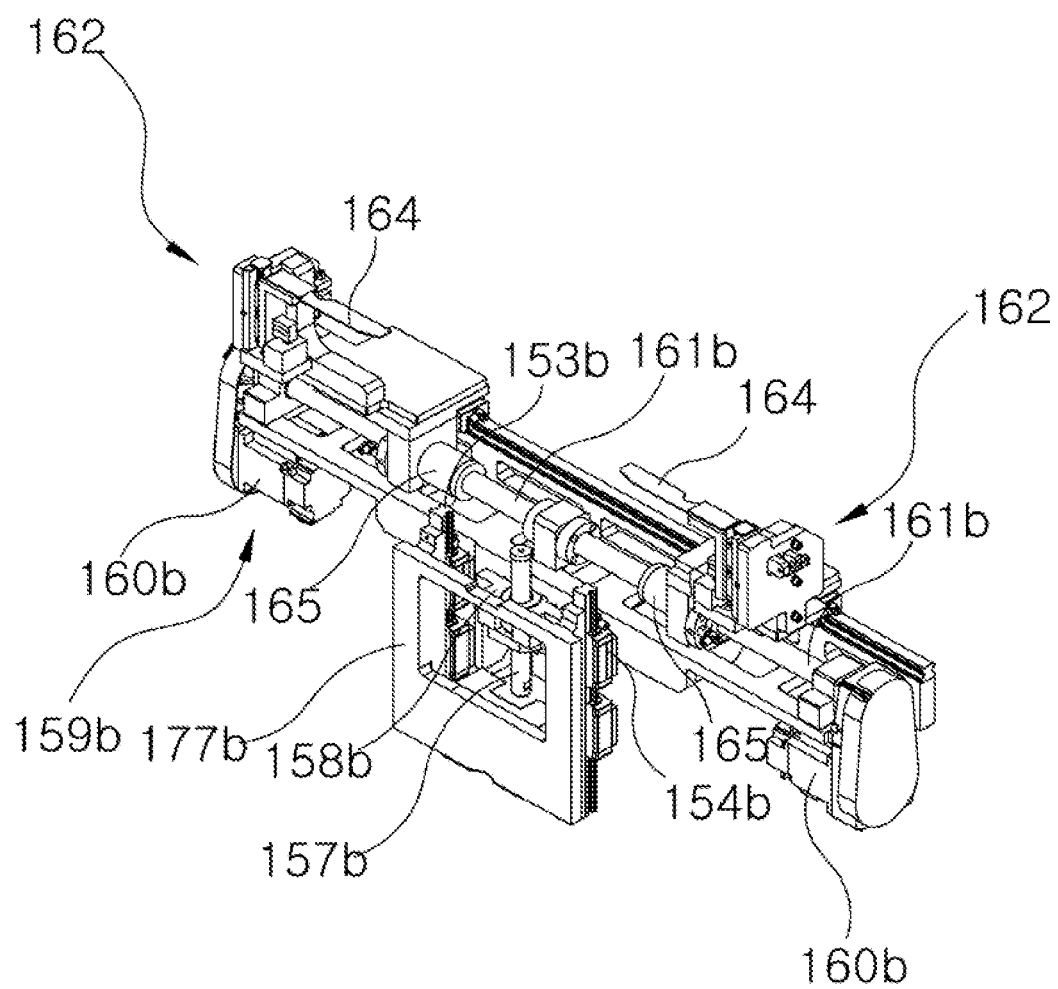
Figure 7A:
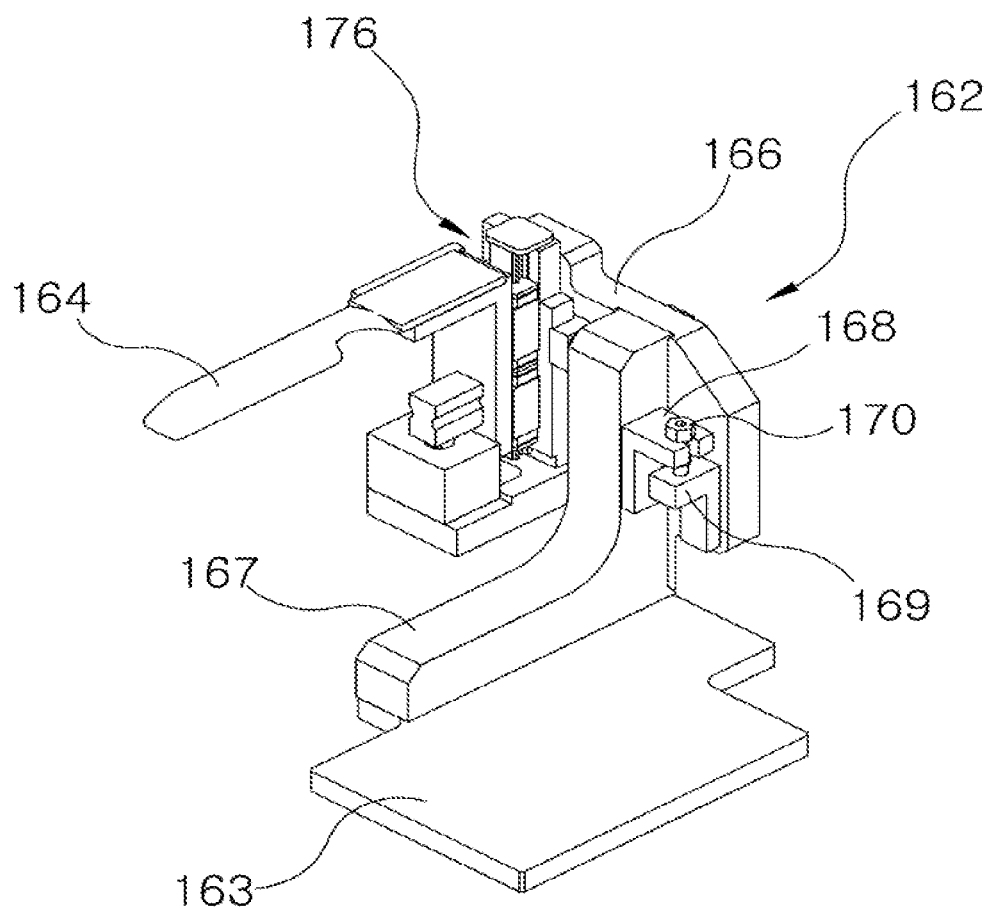
FIGS. 7A and 7B are views illustrating a gripper mounted on the gripper assembly illustrated in FIG. 1.
Figure 7B:
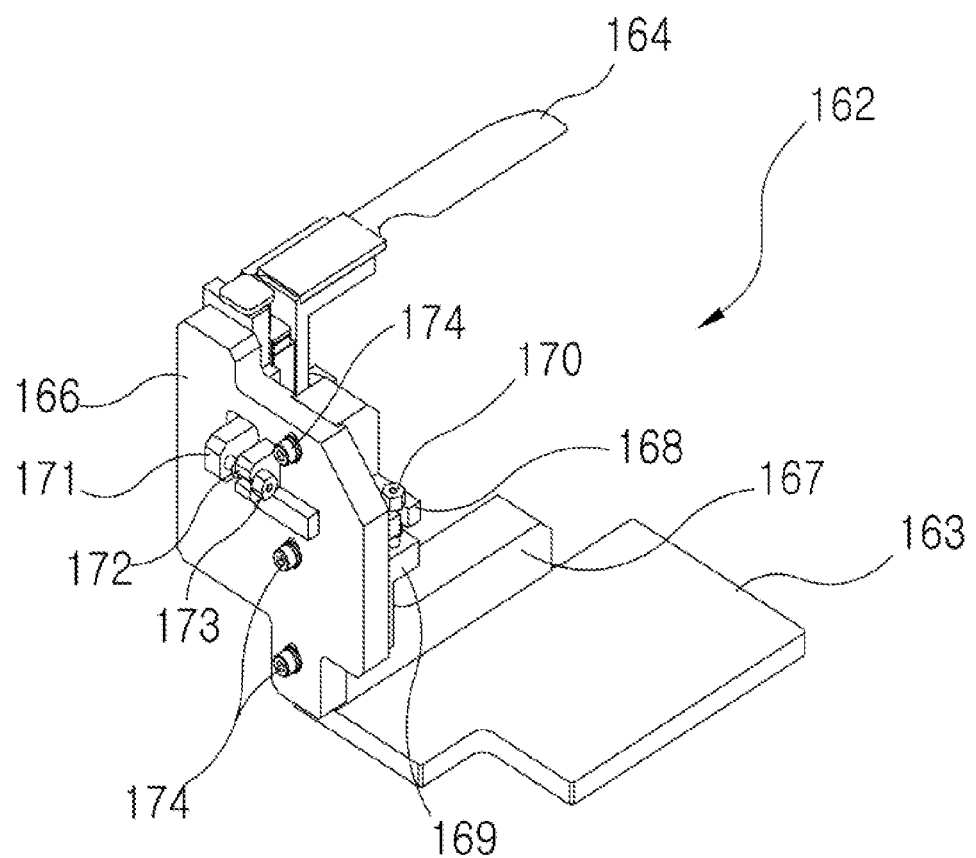

Exemplary embodiments of the present invention will now be described in detail with reference to the accompanying drawings.

Hereinafter, exemplary embodiments of an apparatus for manufacturing a cell stack for a secondary battery according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Among the accompanying drawings, FIGS. 1 to 8B are views illustrating an apparatus for manufacturing a cell stack for a secondary battery according to the present disclosure.

Referring to FIGS. 1 to 8B, an apparatus 100 for manufacturing a cell stack for a secondary battery according to the present disclosure includes; a stack table 130 on which a negative electrode plate N (see FIGS. 8A and 8B) and a positive electrode plate P (see FIGS. 8A and 8B), which are continuously supplied from a negative electrode plate delivering picker 20 (see FIGS. 8A and 8B) and a positive electrode plate delivering picker 30 (see FIGS. 8A and 8B), respectively, are sequentially stacked with a separator S (see FIGS. 8A and 8B) interposed therebetween; an electrode-plate-stacking-position adjusting means 140 configured to adjust a position of the stack table 130 so that the negative electrode plate N and the positive electrode plate P are stacked at a constant position (height) regardless of the number of times of stacking the negative electrode plate N and the positive electrode plate P which are to be stacked; a clamping means 150 configured to press, toward the stack table 130, edge portions of the negative electrode plate N, the positive electrode plate P, and the separator S, which are stacked on the stack table 130, and to clamp the edge portions of the negative electrode plate N, the positive electrode plate P, and the separator S; and a drive means 120 configured to reciprocally turn the stack table 130, the electrode-plate-stacking-position adjusting means 140, and the clamping means 150 to both sides so that the separator S supplied to the stack table 130 is folded in a zigzag shape and the negative electrode plates N and the positive electrode plates P are alternately stacked between folded portions of the separator S folded in the zigzag shape.

In addition, the apparatus 100 for manufacturing a cell stack for a secondary battery according to the present disclosure further includes a support means 110 configured to support the stack table 130, the electrode-plate-stacking-position adjusting means 140, the clamping means 150, and the drive means 120.

First, the support means 110 includes a base 111, and first and second support frames 112a and 112b formed on an upper surface of the base 111.

The first and second support frames 112a and 112b extend in a longitudinal direction of the base 111 and extend vertically outward from the upper surface of the base 111. In this case, as illustrated, the first and second support frames 112a and 112b are spaced apart from each other at a predetermined interval.

Meanwhile, the support means 110 further includes a mounting frame 113 disposed between the first and second support frames 112a and 112b, and a mounting frame lifting servo motor 115 configured to raise or lower the mounting frame 113.

Like the first and second support frames 112a and 112b, the mounting frame 113 extends in the longitudinal direction of the base 111 and extends vertically outward from the upper surface of the base 111.

The mounting frame 113, configured as described above, is disposed between the first and second support frames 112a and 112b so as to be movable upward and downward. To this end, mounting frame lifting LM guides 114a are installed and vertically extend at both sides, i.e., one end and the other end of the mounting frame 113, respectively, and mounting frame lifting LM guide blocks 114b are installed on inner surfaces of the first and second support frames 112a and 112b so as to be slidably fitted with the mounting frame lifting LM guides 114a.

Further, central portions of the first and second support frames 112a and 112b and a central portion of the mounting frame 113 are recessed so that the first and second support frames 112a and 112b and the mounting frame 113 do not interfere with the stack table 130, the electrode-plate-stacking-position adjusting means 140, and the clamping means 150 which are reciprocally turned to both sides by the drive means 120 supported on the mounting frame 113. Unlike the first and second support frames 112a and 112b each having an approximately vertical plate shape, the mounting frame 113 has an approximately U-shaped cross section.

The mounting frame lifting servo motor 115 is installed on a lower surface of the base 111, and a rotating shaft of the mounting frame lifting servo motor 115 penetrates the base 111 and vertically extends. In this case, a mounting frame lifting ball screw 116 is vertically connected, by means of a typical coupling, to the rotating shaft of the mounting frame lifting servo motor 115 which penetrates the base 111.

Further, the mounting frame lifting ball screw 116 vertically penetrates a lower portion of the mounting frame 113, and a mounting frame lifting ball screw nut 117, which is engaged with and penetrated by the mounting frame lifting ball screw 116, is installed on the lower portion of the mounting frame 113.

When a cell stack is completely manufactured on the stack table 130, the mounting frame lifting servo motor 115, which is disposed as described above, rotates the mounting frame lifting ball screw 116 forward to raise the mounting frame 113, and the mounting frame 113, which is raised as described above, guides the manufactured (completely stacked) cell stack to an unloading position.

Further, when the manufactured cell stack is completely unloaded to the outside of the apparatus 100 for manufacturing a cell stack for a secondary battery according to the present disclosure, the mounting frame lifting servo motor 115 rotates the mounting frame lifting ball screw 116 reversely to lower the mounting frame 113.

The drive means 120 includes a tilting frame 121 on which the stack table 130, the electrode-plate-stacking-position adjusting means 140, and the clamping means 150 are mounted, and a tilting servo motor 126 configured to reciprocally turn the tilting frame 121 to both sides of the mounting frame 113.

The tilting frame 121 includes a head part 122 disposed at the recessed central portion of the mounting frame 113 and horizontally extending in a longitudinal direction of the mounting frame 113, and a skirt part 124 formed integrally on a lower surface of the head part 122.

In this case, as illustrated, both ends of the head part 122 further horizontally extend outward from both ends of the skirt part 124. Tilting shafts 125 are mounted at both ends of the head part 122 configured as described above, and the tilting shafts 125 horizontally extend to an upper portion at one end and an upper portion at the other end of the mounting frame 113 which are adjacent to each other.

Further, extension ends of the tilting shafts 125, which extend to the upper portion at one end and the upper portion at the other end of the mounting frame 113, are rotatably supported on the upper portion at one end and the upper portion at the other end of the mounting frame 113, respectively.

The tilting servo motor 126 is installed on the upper portion at one end of the mounting frame 113 on which the tilting shaft 125 is rotatably supported, or the tilting servo motor 126 is installed on each of the upper portion at one end and the upper portion at the other end of the mounting frame 112. A rotating shaft of the tilting servo motor 126, which is installed on the upper portion at one end of the mounting frame 113 or installed on each of the upper portion at one end and the upper portion at the other end of the mounting frame 112, is connected, by means of a speed reducer, to the tilting shaft 125 adjacent to the rotating shaft of the tilting servo motor 126.

The tilting servo motor 126, which is connected to the tilting shaft 125 as described above, reciprocally turns the tilting shaft 125 and the tilting frame 121 to both sides of the mounting frame 113 at a predetermined angle during the process of manufacturing a cell stack. Therefore, the stack table 130, the electrode-plate-stacking-position adjusting means 140, and the clamping means 150, which are mounted on the tilting frame 121, are also reciprocally turned, along with the tilting frame 121, to both sides of the mounting frame 113 at the predetermined angle.

Further, when the cell stack is completely manufactured, the tilting servo motor 126 rotates the tilting shafts 125 to allow the tilting frame 121 to stand vertically, thereby guiding the manufactured cell stack to the unloading position.

The stack table 130 includes a suction table 131 and a lift table 134 which are disposed to be spaced apart from an upper side of the head part 122 of the tilting frame 121.

The suction table 131 has an approximately "]" shape when viewed in a plan view, and multiple vacuum suction holes 132 are formed on the upper surface of the suction table 131 in accordance with a shape of the suction table 131.

As can be seen by anyone, the vacuum suction holes 132 are connected to a typical vacuum tube (not illustrated), and the vacuum suction holes 132 are supplied with vacuum pressure through the vacuum tube, thereby fixing a tip of the separator S supplied to the upper portion of the suction table 131.

Further, a cell stack unloading means (not illustrated) configured to hold the completely manufactured cell stack and transfer the cell stack to a subsequent process enters or exits an opening portion 133 formed in the suction table 131.

The lift table 134 is provided to occupy the inside of the suction table 131 when viewed in a plan view, and the lift table 134, together with the suction table 131, defines a stacking surface on which the negative electrode plate N and the positive electrode plate P may be sequentially stacked with the separator S interposed therebetween.

Meanwhile, the lift table 134 is raised or lowered so that the cell stack unloading means (not illustrated) may easily hold the completely manufactured cell stack. To this end, the stack table 130 further include lift table lifting cylinders 135 configured to raise or lower the lift table 134.

The lift table lifting cylinders 135 are installed at both ends of a second lift plate 144 of the electrode-plate-stacking-position adjusting means 140 to be described below, and cylinder rods of the lift table lifting cylinders 135 extend outward from a lower portion of the second lift plate 144.

Further, the cylinder rods of the lift table lifting cylinders 135 are connected to each other by a first lift plate 136 disposed horizontally outside the lower portion of the second lift plate 144. In this case, the first lift plate 136 and the lift table 134 are connected by means of first connecting rods 137.

The first connecting rods 137 extend from the first lift plate 136, penetrate the second lift plate 144 of the electrode-plate-stacking-position adjusting means 140 disposed between the first lift plate 136 and the skirt part 124, penetrate the skirt part 124, penetrate the head part 122, and penetrate a third lift plate 146 of the electrode-plate-stacking-position adjusting means 140 disposed between the head part 122 and the lift table 134, and then the first connecting rods 137 are connected to a lower portion of the lift table 134.

That is, when the cell stack is completely manufactured on the stack table 130, the tilting servo motor 126 of the drive means 120 stands the tilting frame 121 vertically, and the mounting frame lifting servo motor 115 of the support means 110 raises the mounting frame 113, thereby guiding the completely manufactured cell stack to the unloading position. In this case, the opening portion 133 of the suction table 131 faces the cell stack unloading means (not illustrated). When the cell stack unloading means moves toward the opening portion 133 of the suction table 131 to hold the completely manufactured cell stack, the cylinder rods of the lift table lifting cylinders 135 are extended to lower the first lift plate 136. Further, as the first lift plate 136 is lowered, the lift table 134, which is connected to the first lift plate 136 by means of the first connecting rods 137, is lowered together with the first lift plate 136.

Further, when the cell stack unloading means holds the completely manufactured cell stack through the opening portion 133 and then moves outward, the lift table lifting cylinders 135 retract the extended cylinder rods, such that the first lift plate 136 and the lift table 134 are also returned while being raised.

The electrode-plate-stacking-position adjusting means 140 includes a stacking position adjusting servo motor 141 configured to adjust the position of the stack table 130 so that the negative electrode plate N and the positive electrode plate P are stacked at a constant position (height) with the separator S interposed therebetween during the process of manufacturing a cell stack.

As illustrated, the stacking position adjusting servo motor 141 is installed on a bottom of a hollow portion 127 formed in the skirt part 124 of the tilting frame 121, and a stacking position adjusting ball screw 142 is vertically connected, by means of a typical coupling, to a rotating shaft of the stacking position adjusting servo motor 141.

The stacking position adjusting ball screw 142 extends while vertically penetrating the skirt part 124, vertically penetrating the second lift plate 144 disposed between the lower portion of the skirt part 124 and the first lift plate 136, and vertically penetrating the first lift plate 136. In this case, a stacking position adjusting ball screw nut 143, which is engaged with and penetrated by the stacking position adjusting ball screw 142, is installed on the second lift plate 144.

Further, the second lift plate 144 is connected, by means of second connecting rods 145, to the third lift plate 146 that supports the stack table 130.

As illustrated, the third lift plate 146 is horizontally disposed between the head part 122 of the tilting frame 121 and the stack table 130 so as to support the stack table 130. In this case, the suction table 131 of the stack table 130, which faces an upper surface of the third lift plate 146 adjacent to both ends of the third lift plate 146, is connected to the third lift plate 146 by means of leg members 147.

Further, extension brackets 148 vertically extend from a lower surface of the third lift plate 146 which is connected to both ends of the third lift plate 146, and the extension brackets 148 slidably and vertically penetrate the head part 122 of the tilting frame 121 and face both ends of the skirt part 124. In this case, stacking position adjusting LM guides 149a are installed so as not to interfere with the lift table lifting cylinders 135, and the stacking position adjusting LM guides 149a are installed at both ends of the skirt part 124 which face the extension brackets 148. The stacking position adjusting LM guides 149a are installed vertically in a longitudinal direction of the skirt part 124. Stacking position adjusting LM guide blocks 149b, which are slidably fitted with the stacking position adjusting LM guides 149a, are installed on the extension brackets 148.

That is, during the process of manufacturing a cell stack, when the negative electrode plate N or the positive electrode plate P is stacked on the separator S at a predetermined stacking position, the stacking position adjusting servo motor 141 rotates the stacking position adjusting ball screw 142 forward by a length corresponding to a thickness of the stacked negative electrode plate N or the stacked positive electrode plate P in order to lower the second lift plate 144 to the extent corresponding to the thickness of the negative electrode plate N or the positive electrode plate P. In this case, the third lift plate 146, which is connected to the second lift plate 144 by means of the second connecting rods 145, and the suction table 131 of the stack table 130, which is connected to the third lift plate 146 by means of the leg members 147, are also lowered to the extent corresponding to the thickness of the stacked negative electrode plate N or the stacked positive electrode plate P. Therefore, during the process of manufacturing a cell stack, the negative electrode plate N or the positive electrode plate P is stacked on the separator S at a constant position (height) regardless of the number of times of stacking the negative electrode plate N and the positive electrode plate P to be stacked.

Further, when the cell stack is completely manufactured, the stacking position adjusting servo motor 141 rotates the stacking position adjusting ball screw 142 reversely to return the second and third lift plates 144 and 146 and the stack table 130.

The clamping means 150 includes four gripper assemblies 162 disposed at both ends at one side and both ends at the other side of the stack table 130, and first and second gripper moving units 159a and 159b configured to allow the two gripper assemblies 162, which face each other in a longitudinal direction of the stack table 130, to cooperate with each other, and to move the two gripper assemblies 162 so that the two gripper assemblies 162, which cooperate with each other, alternately press edges at one side and the other side of each of the separator S, the negative electrode plate N, and the positive electrode plate P which are stacked on the stack table 130.

In addition, the clamping means 150 further includes first and second clamping frames 151a and 151b configured to support the first and second gripper moving units 159a and 159b, respectively, and first and second gripper lifting units 155a and 155b configured to raise or lower the first and second clamping frames 151a and 151b, respectively, to allow the gripper assemblies 162 to alternately press the edges at one side and the other side of each of the separator S, the negative electrode plate N, and the positive electrode plate P which are stacked on the stack table 130.

At one side and the other side of the mounting frame 113, the first and second clamping frames 151a and 151b horizontally extend in the longitudinal direction of the mounting frame 113. First and second gripper assembly moving LM guides 152a and 152b are installed on outer surfaces of the first and second clamping frames 151a and 151b, respectively.

Further, the first and second clamping frames 151a and 151b are mounted to be movable upward and downward at one side and the other side of the skirt part 124 of the tilting frame 121, respectively. To this end, first and second gripper assembly lifting LM guides 153a and 153b are installed vertically in the longitudinal direction of the skirt part 124 at one side and the other side of the skirt part 124, and first and second gripper assembly lifting LM guide blocks 154a and 154b, which are slidably fitted with the first and second gripper assembly lifting LM guides 153a and 153b, are installed on inner surfaces of the first and second clamping frames 151a and 151b which face the first and second gripper assembly lifting LM guides 153a and 153b, respectively.

In this case, the first and second gripper assembly lifting LM guides 153a and 153b installed at one side and the other side of the skirt part 124 are installed at one side and the other side of the skirt part 124, by means of first and second support plates 177a and 177b installed at one side and the other side of the skirt part 124, so as not to interfere with the stacking position adjusting servo motor 141.

Meanwhile, the first and second gripper lifting units 155a and 155b include first and second gripper assembly lifting servo motors 156a and 156b disposed at lower sides of outer surfaces of the first and second clamping frames 151a and 151b, respectively, and first and second gripper assembly lifting ball screws 157a and 157b configured to rotate by being connected, by typical power transmission means, to rotating shafts of the first and second gripper assembly lifting servo motors 156a and 156b.

Each of the first and second gripper assembly lifting ball screws 157a and 157b is disposed vertically between each of the first and second clamping frames 151a and 151b and each of first and second support plates 177a and 177b adjacent to each of the first and second gripper assembly lifting servo motors 156a and 156b that interacts with each of the first and second gripper assembly lifting ball screws 157a and 157b.

In this case, lower portions of the first and second gripper assembly lifting ball screws 157a and 157b are rotatably supported at lower sides of the first and second support plates 177a and 177b that extend outward from lower portions of the first and second clamping frames 151a and 151b adjacent to lower portions of the first and second support plates 177a and 177b. First and second gripper assembly lifting ball screw nuts 158a and 158b, which are engaged with and penetrated by the first and second gripper assembly lifting ball screws 157a and 157b, are installed on inner surfaces of the first and second clamping frames 151a and 151b.

Likewise, the first and second gripper assembly lifting servo motors 156a and 156b, which interact with the first and second gripper assembly lifting ball screws 157a and 157b, are also installed at the lower sides of the first and second support plates 177a and 177b. Each of the first and second support plates 177a and 177b has an approximately "L" shape when viewed from the lateral side.

In this case, the typical power transmission means, which connect the first and second gripper assembly lifting servo motors 156a and 156b and the first and second gripper assembly lifting ball screws 157a and 157b, may be timing belt pulleys and timing belts. Because the connection relationships, using the timing belt pulleys and the timing belts, between the first and second gripper assembly lifting servo motors 156a and 156b and the first and second gripper assembly lifting ball screws 157a and 157b are publicly known technologies, a detailed description thereof will be omitted.

During the process of manufacturing a cell stack, the first and second gripper assembly lifting servo motors 156a and 156b of the first and second gripper lifting units 155a and 155b configured as described above raise or lower the first and second clamping frames 151a and 151b so that the gripper assemblies 162 may alternately press the edges at one side and the other side of each of the separator S, the negative electrode plate N, and the positive electrode plate P which are stacked on the stack table 130.

In addition, when the cell stack unloading means holds the completely manufactured cell stack in order to unload the completely manufactured cell stack, the first and second gripper assembly lifting servo motors 156a and 156b of the first and second gripper lifting units 155a and 155b rotate the first and second gripper assembly lifting ball screws 157a and 157b forward to raise the first and second clamping frames 151a and 151b. In this case, the gripper assemblies 162, which press and restrict the completely manufactured cell stack, are raised together with the first and second clamping frames 151a and 151b, such that the cell stack unloading means may unload the completely manufactured cell stack to the outside.

Further, when the cell stack unloading means completely unload the completely manufactured cell stack, the first and second gripper assembly lifting servo motors 156a and 156b rotate the first and second gripper assembly lifting ball screws 157a and 157b reversely to lower the first and second clamping frames 151a and 151b. In this case, the gripper assemblies 162 are also lowered and returned together with the first and second clamping frames 151a and 151b.

The first gripper moving unit 159a includes a pair of gripper assembly moving servo motors 160a installed at both ends of a lower portion of the first clamping frame 151a, and a pair of gripper assembly moving ball screws 161a rotatably supported on an upper portion of the first clamping frame 151a and extending horizontally in a longitudinal direction of the first clamping frame 151a so as not to interfere with each other at the upper portion of the first clamping frame 151a.

Likewise, the second gripper moving unit 159b includes a pair of gripper assembly moving servo motors 160b installed at both ends of a lower portion of the second clamping frame 151b, and a pair of gripper assembly moving ball screws 161b rotatably supported on an upper portion of the second clamping frame 151b and extending horizontally in a longitudinal direction of the second clamping frame 151b so as not to interfere with each other at the upper portion of the second clamping frame 151b.

That is, any one of the pair of gripper assembly moving ball screws 161a provided on the upper portion of the first clamping frame 151a horizontally extends from one end of the upper portion of the first clamping frame 151a to a central portion of the first clamping frame 151a, and the other of the pair of gripper assembly moving ball screws 161a horizontally extends from the other end of the upper portion of the first clamping frame 151a to the central portion of the first clamping frame 151a. In this case, any one of the pair of gripper assembly moving ball screws 161a provided on the upper portion of the first clamping frame 151a is connected, by a typical power transmission means, to a rotating shaft of one gripper assembly moving servo motor 160a adjacent to one gripper assembly moving ball screw 161a, and the other gripper assembly moving ball screw 161a connected, by a typical power transmission means, to the other gripper assembly moving servo motor 160a adjacent to the other gripper assembly moving ball screw 161a.

Further, likewise, any one of the pair of gripper assembly moving ball screws 161b provided on the upper portion of the second clamping frame 151b horizontally extends from one end of the upper portion of the second clamping frame 151b to a central portion of the second clamping frame 151b, and the other of the pair of gripper assembly moving ball screws 161b horizontally extends from the other end of the upper portion of the second clamping frame 151b to the central portion of the clamping frame 151b. In this case, any one of the pair of gripper assembly moving ball screws 161b provided on the upper portion of the second clamping frame 151b is connected, by a typical power transmission means, to a rotating shaft of one gripper assembly moving servo motor 160b adjacent to one gripper assembly moving ball screw 161b, and the other gripper assembly moving ball screw 161b is connected, by a typical power transmission means, to the other gripper assembly moving servo motor 160b adjacent to the other gripper assembly moving ball screw 161b.

Meanwhile, screw threads of the pair of gripper assembly moving ball screws 161a provided on the upper portion of the first clamping frame 151a extend in opposite directions. Likewise, screw threads of the pair of gripper assembly moving ball screws 161b provided on the upper portion of the second clamping frame 151b extend in opposite directions.

In the present disclosure, the first gripper moving unit 159a includes the two gripper assembly moving servo motors 160a and the two gripper assembly moving ball screws 161a, and similarly, the second gripper moving unit 159b includes the two gripper assembly moving servo motors 160b and the two gripper assembly moving ball screws 161b. However, as can be seen by anyone, each of the first and second gripper moving units 159a and 159b may include a single gripper assembly moving servo motor, and a single gripper moving ball screw having screw threads formed in opposite directions from a central portion to respective ends.

The four gripper assemblies 162 have an identical configuration and an identical shape. Each of the gripper assemblies 162 includes a slider 163, and a gripper 164 mounted on the slider 163.

The two gripper assemblies 162 configured as described above make up one set so as to face each other and are connected to the first gripper moving unit 159a and the second gripper moving unit 159b.

That is, the slider 163 of any one gripper assembly 162, which is connected to the first gripper moving unit 159a, is connected to any one gripper assembly moving ball screw 161a of the first gripper moving unit 159a, and the slider 163 of the other gripper assembly 162, which is connected to the first gripper moving unit 159a, is connected to the other gripper assembly moving ball screw 161a of the first gripper moving unit 159a.

Further, the slider 163 of any one gripper assembly 162, which is connected to the second gripper moving unit 159b, is connected to any one gripper assembly moving ball screw 161b of the second gripper moving unit 159b, and the slider 163 of the other gripper assembly 162, which is connected to the second gripper moving unit 159b, is connected to the other gripper assembly moving ball screw 161b of the second gripper moving unit 159b.

In this case, gripper assembly moving ball screw nuts 165, which are engaged with the gripper assembly moving ball screws 161a and 161b of the first and second gripper moving units 159a and 159b, are installed on lower portions of the sliders 163 of the gripper assemblies 162, respectively.

Further, gripper assembly moving LM guide blocks 175, which are slidably fitted with the first gripper assembly moving LM guide 152a formed on the outer surface of the first clamping frame 151a, are installed on the sliders 163 of the gripper assemblies 162, respectively, which are connected to any one gripper assembly moving ball screw 161a and the other gripper assembly moving ball screw 161a of the first gripper moving unit 159a, respectively. Likewise, gripper assembly moving LM guide blocks 175, which are slidably fitted with the second gripper assembly moving LM guide 152b formed on the outer surface of the second clamping frame 151b, are installed on the sliders 163 of the gripper assemblies 162, respectively, which are connected to any one gripper assembly moving ball screw 161b and the other gripper assembly moving ball screw 161b of the second gripper moving unit 159b, respectively.

The two gripper assemblies 162, which are connected to the first gripper moving unit 159a as described above, are moved in the directions toward or away from both ends at one side of the stack table 130 by the operations of the gripper assembly moving servo motors 160a, and similarly, the two gripper assemblies 162, which are connected to the second gripper moving unit 159b, are moved in the directions toward or away from both ends at the other side of the stack table 130 by the operations of the gripper assembly moving servo motors 160b.

Meanwhile, as illustrated, the gripper 164, which is mounted on the slider 163 of each of the gripper assemblies 162, has a horizontally extending bar shape. The gripper 164 is mounted on an actuator 176 such as a typical pneumatic cylinder or a typical linear motor so as to be movable upward and downward.

Further, the actuator 176 on which the gripper 164 is mounted is fixedly mounted on a variable block 166 having a vertical plate shape. The variable block 166 is coupled and supported, by means of screws 174, onto a rear surface of a fixed block 167 fixedly mounted on the slider 163.

When the sliders 163 are moved to the stack table 130 in order to press and fix the separator S, the negative electrode plate N, and the positive electrode plate P which are stacked on the stack table 130, the grippers 164, which are supported on the sliders 163 as described above, are raised and then lowered by the operations of the first and second gripper assembly lifting servo motors 156a and 156b of the first and second gripper lifting units 155a and 155b, thereby pressing and fixing the edges at one side and the other side of each of the separator S, the negative electrode plate N, and the positive electrode plate P.

Further, the grippers 164 are mounted on the sliders 163 so that reference positions of the grippers 164 may be finely adjusted in left, right, up, and down directions.

To this end, a first fixing piece 168 is protrudingly mounted at one side of the fixed block 167, and a first variable piece 169, which vertically faces the first fixing piece 168, is protrudingly mounted on a front surface of the variable block 166 which faces the first fixing piece 168. In this case, a first fine adjustment bolt 170 having a threaded portion having an end fastened to the first variable piece 169 is fitted with the first fixing piece 168.

Further, a second fixing piece 171, which extends horizontally while penetrating the variable block 166, is mounted at the other side of the fixed block 167, and a second variable piece 172, which faces the second fixing piece 171 in the left-right direction, is protrudingly mounted on a rear surface of the variable block 166. In this case, a second fine adjustment bolt 173 having a threaded portion having an end fastened to the second fixing piece 171 is fitted with the second variable piece 172.

In this case, an operation of finely adjusting the reference position of each of the grippers 164 is performed by slightly loosening the screws 174, which are configured to couple and support the variable block 166 to the fixed block 167, so that the variable block 166 may be moved, and then loosening or tightening the first and second fine adjustment bolts 170 and 173. When the operation of finely adjusting the reference position of the gripper 164 is completed, the screws 174 are fully fastened again, such that the variable block 166 is coupled to and supported on the fixed block 167.

Hereinafter, an operating state of the apparatus for manufacturing a cell stack for a secondary battery according to the present disclosure configured as described above will be briefly described.

In order to manufacture a cell stack by using the apparatus 100 for manufacturing an inner cell stack for a secondary battery according to the present disclosure, a tip of the separator S supplied from a separator supply unit 10 is fixed onto the suction table 131 of the stack table 130.

Figure 8A:
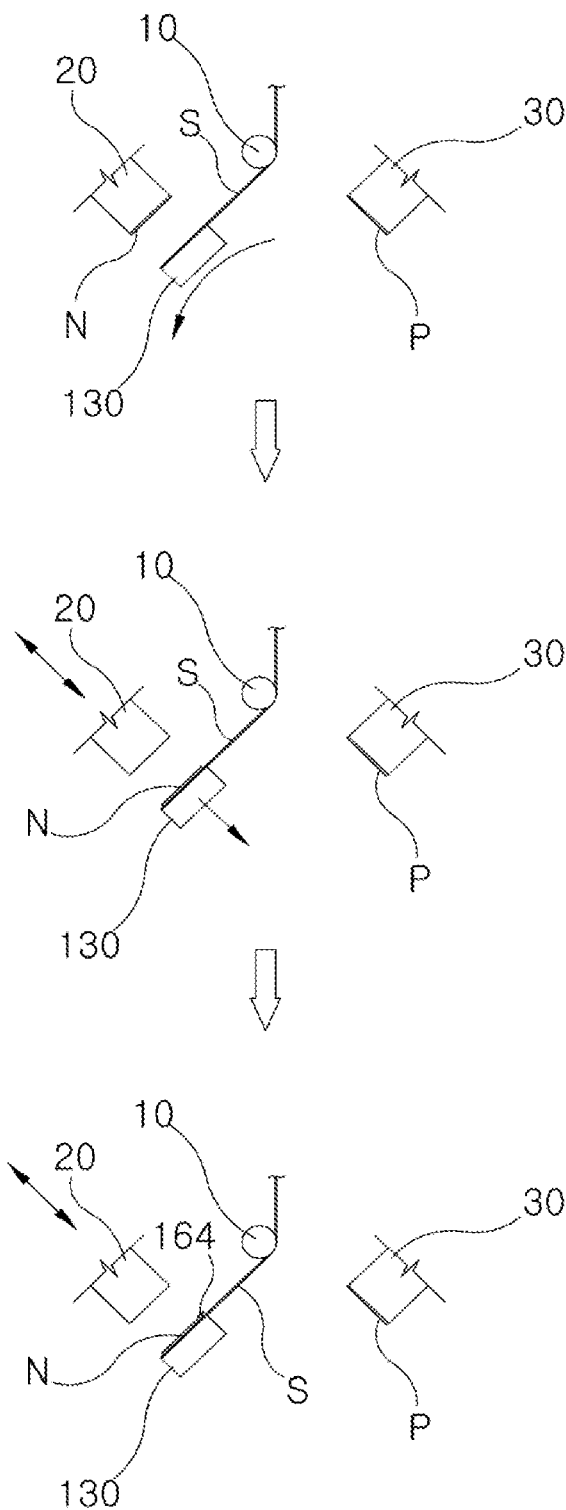
FIGS. 8A and 8B are views schematically illustrating a state in which a negative electrode plate, a positive electrode plate, and a separator are stacked on a stack table illustrated in FIG. 1.

When the tip of the separator S is fixed onto the stack table 130, the drive means 120 operates the tilting servo motor 126 to turn the tilting shaft 125 toward a negative electrode plate delivering picker 20 first in order to fold the separator S in a zigzag shape and alternately stack the negative electrode plate N and the positive electrode plate P between the folded portions of the separator S (see FIG. 8A).

When the tilting shaft 125 is turned toward the negative electrode plate delivering picker 20, the tilting frame 121 mounted on the tilting shaft 125 is also turned toward the negative electrode plate delivering picker 20. Further, the stack table 130, the electrode-plate-stacking-position adjusting means 140, and the clamping means 150, which are mounted on the tilting frame 121, are also turned toward the negative electrode plate delivering picker 20, and the stack table 130 onto which the separator S is fixed faces the negative electrode plate delivering picker 20. In this case, the negative electrode plate delivering picker 20 places the sucked negative electrode plate N on the separator S fixed onto the stack table 130 and then moves upward (see FIG. 8A).

Further, at the same time, the clamping means 150 moves the two gripper assemblies 162, supported on second clamping frame 151b, toward the stack table 130 so that the two gripper assemblies 162 are adjacent to the stack table 130. In this case, the grippers 164 mounted on the gripper assemblies 162 are raised and then lowered by the operation of the second gripper assembly lifting servo motor 156b of the second gripper lifting unit 155b, thereby pressing and fixing, toward the stack table 130, the edges at both ends of the other side of the negative electrode plate N placed on the separator S (see FIG. 8A).

Further, at the same time, the electrode-plate-stacking-position adjusting means 140 operates the stacking position adjusting servo motor 141 to lower the stack table 130 to the extent corresponding to the thickness of the negative electrode plate N placed on the separator S (see FIG. 8A).

Figure 8B:
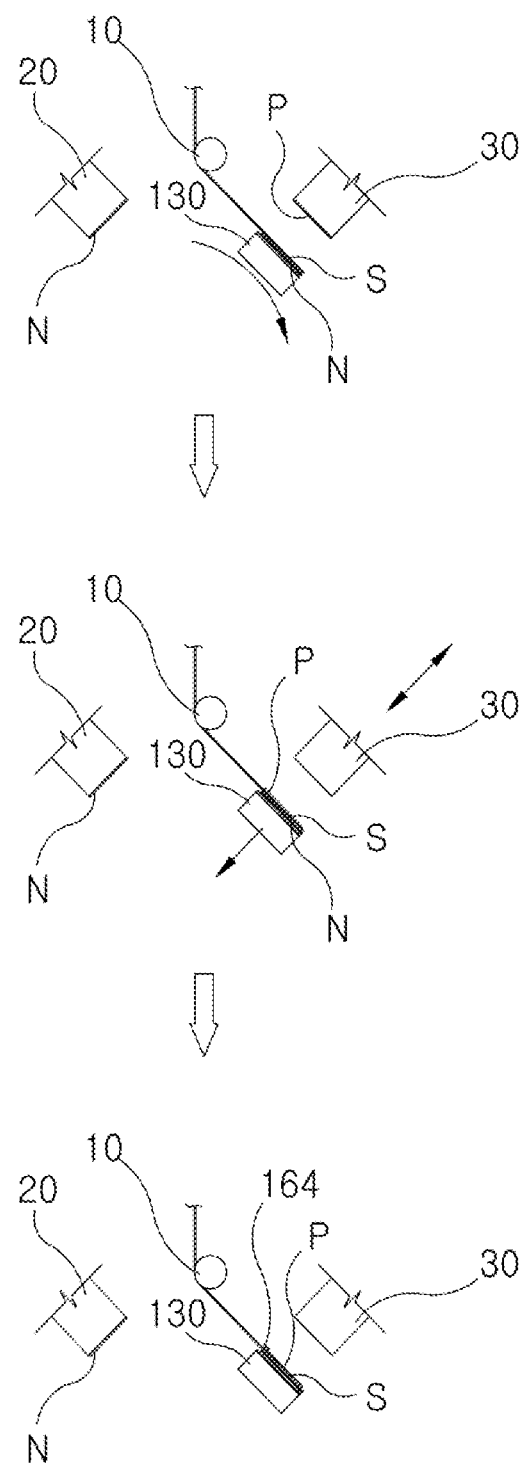

When one negative electrode plate N is placed and stacked on the separator S as described above, the tilting servo motor 126 turns the tilting shaft 125 toward a positive electrode plate delivering picker 30 (see FIG. 8B).

When the tilting shaft 125 is turned toward the positive electrode plate delivering picker 30, the tilting frame 121 mounted on the tilting shaft 125 is also turned toward the positive electrode plate delivering picker 30. Further, the stack table 130, the electrode-plate-stacking-position adjusting means 140, and the clamping means 150, which are mounted on the tilting frame 121, are also turned toward the positive electrode plate delivering picker 30, and the stack table 130 onto which the separator S is fixed faces the positive electrode plate delivering picker 30. In this case, since the grippers 164 of the gripper assemblies 162 supported on the second clamping frame 151b press and fix the other side of the negative electrode plate N stacked on the stack table 130, the separator S supplied from the separator supply unit 10 covers an upper portion of the negative electrode plate N stacked on the stack table 130 (see FIG. 8B).

Further, when the negative electrode plate N stacked on the stack table 130 is covered by the separator S, the positive electrode plate delivering picker 30 places the sucked positive electrode plate P on the separator S which covers the negative electrode plate N, and then the positive electrode plate delivering picker 30 moves upward (see FIG. 8B).

Further, at the same time, the clamping means 150 moves the two gripper assemblies 162, supported on the first clamping frame 151a, toward the stack table 130 so that the two gripper assemblies 162 are adjacent to the stack table 130. In this case, the grippers 164 mounted on the two gripper assemblies 162 are raised and then lowered by the operation of the first gripper assembly lifting servo motor 156a of the first gripper lifting unit 155a, thereby pressing and fixing, toward the stack table 130, the edges at both ends of one side of the positive electrode plate P placed on the separator S. At the same time, the two gripper assemblies 162 of the second clamping frame 151b, which press and fix the edges at both ends of the other side of the negative electrode plate N, are moved away from the stack table 130, thereby releasing the edges at both ends of the other side of the negative electrode plate N (see FIG. 8B).

Further, at the same time, the electrode-plate-stacking-position adjusting means 140 operates the stacking position adjusting servo motor 141 to lower the stack table 130 to the extent corresponding to the thickness of the positive electrode plate P placed on the separator S (see FIG. 8B).

When one positive electrode plate P is stacked with the separator S interposed between the positive electrode plate P and the negative electrode plate N as described above, the tilting servo motor 126 turns the tilting shaft 125 again toward the negative electrode plate delivering picker 20.

When the tilting shaft 125 is turned again toward the negative electrode plate delivering picker 20, the stack table 130 faces the negative electrode plate delivering picker 20 again. In this case, since the grippers 164 of the gripper assemblies 162 supported on the first clamping frame 151a press and fix one end of the positive electrode plate P stacked on the stack table 130, the separator S supplied from the separator supply unit 10 covers an upper portion of the positive electrode plate P stacked on the stack table 130, and the negative electrode plate N is placed and fixed again onto the separator S that covers the positive electrode plate P, as illustrated in FIG. 8A.

That is, as the above-mentioned method is repeatedly performed, the negative electrode plates N and the positive electrode plates P are stacked with the separators S interposed therebetween.

Meanwhile, when the cell stack is manufactured by completing the operation of stacking, a target number of times, the negative electrode plates N and the positive electrode plates P with the separators S interposed therebetween, the tilting servo motor 126 rotates the tilting shaft 125 to stand the tilting frame 121 and the stack table 130 vertically in order to unload the completely manufactured cell stack. At the same time, the support means 110 operates the mounting frame lifting servo motor 115 to raise the mounting frame 113 so that the completely manufactured cell stack is guided to the unloading position.

Further, when the completely manufactured cell stack is guided to the unloading position, the suction table 131 of the stack table 130 faces the cell stack unloading means (not illustrated). In this case, the cell stack unloading means moves toward the opening portion 133 of the suction table 131 in order to hold the completely manufactured cell stack. When the cell stack unloading means moves toward the opening portion 133 of the suction table 131 in order to hold the completely manufactured cell stack, the lift table lifting cylinders 135 of the stack table 130 extend the cylinder rods to lower the lift table 134. When the cell stack unloading means holds the completely manufactured cell stack through the opening portion 133 and moves outward, the lift table lifting cylinders 135 retract the lift table 134.

Further, when the separator S is cut from the cell stack unloaded by the cell stack unloading means, the mounting frame lifting servo motor 115 returns the mounting frame 113 to prepare for a subsequent process.

According to the apparatus 100 for manufacturing a cell stack for a secondary battery according to the present disclosure configured as described above, it is possible to change the height of the stack table 130 in accordance with the number of times of stacking the negative electrode plate N and the positive electrode plate P during a process of manufacturing a cell stack, and as a result, it is possible to always maintain a constant position (height) at which the negative electrode plate N and the positive electrode plate P are stacked. Accordingly, it is possible to solve the problem, in the related art, that the separator S is torn or damaged during the process of manufacturing a cell stack.

While the specific exemplary embodiments of the present invention have been described and illustrated, it is obvious to those skilled in the art that the present invention is not limited to the aforementioned exemplary embodiments, and may be variously changed and modified without departing from the spirit and the scope of the present invention. Therefore, the changed or modified examples should not be appreciated individually from the technical spirit or prospect of the present invention, and the modified examples belong to the claims of the present invention.

As set forth above, according to exemplary embodiments of the invention, it is possible to change the height of the stack table in accordance with the number of times of stacking the negative and positive electrode plates during a process of manufacturing a cell stack, and as a result, it is possible to always maintain a constant position (height) at which the negative and positive electrode plates are stacked. Accordingly, it is possible to solve the problem, in the related art, that the separator is torn or damaged during the process of manufacturing a cell stack.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for manufacturing a cell stack for a secondary battery, the apparatus comprising:
    a stack table on which a negative electrode plate and a positive electrode plate are sequentially stacked with a separator interposed therebetween;
    an electrode-plate-stacking-position adjusting means configured to adjust a position of the stack table so that the negative electrode plate and the positive electrode plate are stacked at a constant position regardless of the number of times of stacking the negative electrode plate and the positive electrode plate;
    a clamping means configured to press, toward the stack table, edge portions at one side and the other side of each of the negative electrode plate, the positive electrode plate, and the separator, which are stacked on the stack table, and to clamp the edge portions of the negative electrode plate, the positive electrode plate, and the separator;
    a drive means including a tilting frame having a skirt part, the drive means configured to reciprocally turn the stack table, the electrode-plate-stacking-position adjusting means, and the clamping means to both sides so that the separator supplied to the stack table is folded in a zigzag shape and the negative electrode plate and the positive electrode plate are alternately stacked between folded portions of the separator; and
    a support means configured to support the stack table, the electrode-plate-stacking-position adjusting means, the clamping means, and the drive means,
    wherein the electrode-plate-stacking-position adjusting means includes:
    a stacking position adjusting servo motor installed on a bottom of a hollow portion formed in the skirt part of the tilting frame of the drive means;
    a second lift plate disposed at a lower side of the skirt part of the tilting frame of the drive means;
    a stacking position adjusting ball screw connected to a rotating shaft of the stacking position adjusting servo motor, penetrating the skirt part, and penetrating the second lift plate, the stacking position adjusting ball screw configured to engage with and penetrate a stacking position adjusting ball screw nut installed on the second lift plate; and
    a third lift plate disposed between a head part of the tilting frame and the stack table to support the stack table, the third lift plate connected to the second lift plate via first connecting rods, and
    wherein the stacking position adjusting servo motor is configured to lower the second lift plate, the third lift plate, and the stack table by rotating the stacking position adjusting ball screw by a length corresponding to a thickness of the stacked negative electrode plate or the stacked positive electrode plate during a process of manufacturing a cell stack.

2. The apparatus of claim 1, wherein the support means comprises:
    a base;
    first and second support frames extending in a longitudinal direction of the base and vertically outward from an upper surface of the base, the first and second support frames spaced apart from each other;
    a mounting frame disposed between the first and second support frames so as to be movable upward and downward; and
    a mounting frame lifting servo motor configured to raise or lower the mounting frame.

3. The apparatus of claim 2, wherein the mounting frame lifting servo motor is installed on a lower surface of the base, a rotating shaft of the mounting frame lifting servo motor penetrates the base and vertically extends, a mounting frame lifting ball screw is vertically connected to the rotating shaft of the mounting frame lifting servo motor, and a mounting frame lifting ball screw nut, which is engaged with and penetrated by the mounting frame lifting ball screw, is installed on a lower portion of the mounting frame.

4. The apparatus of claim 2, wherein:
    the electrode-plate-stacking-position adjusting means and the clamping means are mounted on the tilting frame of the drive means; and
    the drive means comprises a tilting servo motor configured to reciprocally turn the tilting frame to both sides of the mounting frame of the support means, and the tilting servo motor is installed on an upper portion at one end or the other end of the mounting frame and connected to the tilting frame.

5. The apparatus of claim 4, wherein:
    the tilting frame comprises a head part disposed at a recessed central portion of the mounting frame and horizontally extending in a longitudinal direction of the mounting frame;
    the skirt part is formed integrally on a lower surface of the head part;
    both ends of the head part horizontally extend outward from both ends of the skirt part, and tilting shafts are mounted at both ends of the head part and horizontally extend to an upper portion at one end and an upper portion at the other end of the mounting frame which are adjacent to each other; and
    extension ends of the tilting shafts, which extend to the upper portion at one end and the upper portion at the other end of the mounting frame, are rotatably supported on the upper portion at one end and the upper portion at the other end of the mounting frame, and any one of the tilting shafts is connected to the tilting servo motor.

6. The apparatus of claim 1, wherein the third lift plate and the stack table are connected via leg members, and the leg members are connected to a suction table of the stack table that faces an upper surface of the third lift plate adjacent to both ends the third lift plate.

7. The apparatus of claim 1, wherein extension brackets, which vertically and slidably penetrate the head part and face both ends of the skirt part, vertically extend from a lower surface of the third lift plate which is connected to both ends of the third lift plate, stacking position adjusting LM guides are installed at both ends of the skirt part which face the extension brackets, the stacking position adjusting LM guides are installed vertically in a longitudinal direction of the skirt part, and stacking position adjusting LM guide blocks, which are slidably fitted with the stacking position adjusting LM guides, are installed on the extension brackets.

8. The apparatus of claim 1, wherein the stack table comprises:
a suction table disposed to be spaced apart from an upper side of the head part;
a lift table provided to occupy the inside of the suction table; and
lift table lifting cylinders configured to raise or lower the lift table, the lift table lifting cylinders are installed at lower sides at both ends of the second lift plate so that cylinder rods are extended outward from a lower portion the skirt part of the tilting frame, the cylinder rods of the lift table lifting cylinders are connected to each other by a first lift plate horizontally disposed outside a lower portion of the second lift plate, and the first lift plate and the lift table are connected by means of second connecting rods that penetrate the second lift plate, the skirt part, the head part, and the third lift plate.

9. The apparatus of claim 1, wherein the clamping means comprises:
two gripper assemblies disposed at both ends at one side and both ends at the other side of the stack table;
first and second gripper moving units configured to allow the two gripper assemblies, which face each other in a longitudinal direction of the stack table, to cooperate with each other, and to move the two gripper assemblies so that the two gripper assemblies, which cooperate with each other, alternately press edges at one side and the other side of each of the separator, the negative electrode plate, and the positive electrode plate which are stacked on the stack table;
first and second clamping frames configured to support the first and second gripper moving units, respectively; and
first and second gripper lifting units configured to raise or lower the first and second clamping frames to allow the gripper assemblies to alternately press the edges at one side and the other side of each of the separator, the negative electrode plate, and the positive electrode plate which are stacked on the stack table.

10. The apparatus of claim 9, wherein the support means comprises a mounting frame, the first and second clamping frames horizontally extend in a longitudinal direction of the mounting frame at one side and the other side of the mounting frame of the support means, the first and second clamping frames are mounted to be movable upward and downward at one side and the other side of a skirt part of a tilting frame of the drive means, first and second gripper assembly lifting LM guides are installed vertically in a longitudinal direction of the skirt part at one side and the other side of the skirt part, and first and second gripper assembly lifting LM guide blocks, which are slidably fitted with the first and second gripper assembly lifting LM guides, are installed on inner surfaces of the first and second clamping frames which face the first and second gripper assembly lifting LM guides,
wherein the first and second gripper lifting units comprise:
first and second gripper assembly lifting servo motors disposed at lower sides of outer surfaces of the first and second clamping frames; and
first and second gripper assembly lifting ball screws configured to rotate by being connected, by power transmission means, to rotating shafts of the first and second gripper assembly lifting servo motors, and
wherein each of the first and second gripper assembly lifting ball screws is disposed vertically between the skirt part and each of the first and second clamping frames, and first and second gripper assembly lifting ball screw nuts, which are engaged with and penetrated by the first and second gripper assembly lifting ball screws, are installed on inner surfaces of the first and second clamping frames.

11. The apparatus of claim 9, wherein the first gripper moving unit comprises:
a pair of gripper assembly moving servo motors installed at both ends of a lower portion of the first clamping frame; and
a pair of gripper assembly moving ball screws rotatably supported on an upper portion of the first clamping frame and extending horizontally in a longitudinal direction of the first clamping frame so as not to interfere with each other at the upper portion of the first clamping frame, the pair of gripper assembly moving ball screws having screw threads extending in opposite directions,
wherein the gripper assembly moving ball screws of the first gripper moving unit are connected, by power transmission means, to the gripper assembly moving servo motors disposed adjacent to the gripper assembly moving ball screws,
wherein the second gripper moving unit comprises:
a pair of gripper assembly moving servo motors installed at both ends of a lower portion of the second clamping frame; and
a pair of gripper assembly moving ball screws rotatably supported on an upper portion of the second clamping frame and extending horizontally in a longitudinal direction of the second clamping frame so as not to interfere with each other at the upper portion of the second clamping frame, the pair of gripper assembly moving ball screws having screw threads extending in opposite directions, and
wherein the gripper assembly moving ball screws of the second gripper moving unit are connected, by power transmission means, to the gripper assembly moving servo motors disposed adjacent to the gripper assembly moving ball screws.

12. The apparatus of claim 11, wherein each of the gripper assemblies comprises:
a slider; and
a gripper mounted on the slider and having a bar shape extending horizontally, and
wherein the two gripper assemblies are connected to and face the pair of gripper assembly moving ball screws of the first gripper moving unit, the two gripper assemblies are connected to and face the pair of gripper assembly moving ball screws of the second gripper moving unit, gripper assembly moving ball screw nuts, which are engaged with the corresponding gripper assembly moving ball screws, are installed on the sliders of the gripper assemblies, and gripper assembly moving LM guide blocks, which are slidably fitted with first and second gripper assembly moving LM guides formed any outer surfaces of the first and second clamping frames, are installed on the sliders of the gripper assemblies.

13. The apparatus of claim 12, wherein the gripper is mounted on an actuator so as to be movable upward and downward, the actuator is fixedly mounted on a variable block having a vertical plate shape, and the variable block is coupled and supported, by means of screws, onto a rear surface of a fixed block fixedly mounted on the slider.

14. The apparatus of claim 13, wherein a first fixing piece is protrudingly mounted at one side of the fixed block, a first variable piece, which vertically faces the first fixing piece, protrudingly mounted on the variable block which faces the first fixing piece, a first fine adjustment bolt having a threaded portion having an end fastened to the first variable piece is fitted with the first fixing piece, a second fixing piece, which extends horizontally while penetrating the variable block, is mounted at the other side of the fixed block, a second variable piece, which faces the second fixing piece in a left-right direction, is protrudingly mounted on a rear surface of the variable block, and a second fine adjustment bolt having a threaded portion having an end fastened to the second fixing piece is fitted with the second variable piece.

* * * * *